US008759556B2

(12) United States Patent
Piccirilli et al.

(10) Patent No.: US 8,759,556 B2
(45) Date of Patent: Jun. 24, 2014

(54) METHOD FOR OBTAINING A FRACTION ENRICHED WITH FUNCTIONALIZED FATTY ACID ESTERS FROM SEEDS OF OLEAGINOUS PLANTS

(75) Inventors: Antoine Piccirilli, Poitiers (FR); Jacques Barbier, Montamise (FR); Julien Magne, Iteuil (FR); Jean-Luc Dubois, Millery (FR)

(73) Assignee: Arkema France, Colombes (FR)

( * ) Notice: Subject to any disclaimer, the term of this patent is extended or adjusted under 35 U.S.C. 154(b) by 153 days.

(21) Appl. No.: 13/145,507

(22) PCT Filed: Jan. 13, 2010

(86) PCT No.: PCT/FR2010/050047
§ 371 (c)(1),
(2), (4) Date: Dec. 15, 2011

(87) PCT Pub. No.: WO2010/084276
PCT Pub. Date: Jul. 29, 2010

(65) Prior Publication Data
US 2012/0077999 A1    Mar. 29, 2012

(30) Foreign Application Priority Data
Jan. 20, 2009 (FR) .................. 09 50330

(51) Int. Cl.
*C09F 7/00* (2006.01)
*C11C 3/10* (2006.01)
(52) U.S. Cl.
USPC .............. 554/30; 554/169; 554/206; 554/210
(58) Field of Classification Search
USPC .................. 554/30, 169, 206, 210
See application file for complete search history.

(56) References Cited

U.S. PATENT DOCUMENTS

| 7,112,229 B2* | 9/2006 | Khalil et al. ............ 44/308 |
| 2005/0011112 A1 | 1/2005 | Khalil et al. |
| 2005/0016059 A1* | 1/2005 | Kovacs et al. .......... 44/401 |

FOREIGN PATENT DOCUMENTS

| EP | 1 119 600 | 7/2005 |
| GB | 707421 | 4/1954 |

(Continued)

OTHER PUBLICATIONS

Tassignon et al: "An efficient countercurrent distribution method for the large-scale isolation of dimorphecolic acid methyl ester" Chemistry and Physics of Lipids, vol. 71, No. 2, May 23, 1994, pp. 187-196.*
Tassignon et al., "An Efficient Countercurrent Distribution Method for the Large-Scale Isolation of Dimorphecolic Acid Methyl Ester," Chemistry and Physics of Lipids, vol. 71, No. 2, pp. 187-196 (1994).

(Continued)

*Primary Examiner* — Deborah D Carr
(74) *Attorney, Agent, or Firm* — Hunton & Williams LLP (57) ABSTRACT

The invention relates to a method for the selective extraction of functionalised fatty acid esters from seeds of oleaginous plants, wherein said method includes: a) at least one step of extracting fatty acid esters that comprises simultaneously feeding into a reactor containing said seeds a light anhydrous alcohol, a basic catalyst and an extraction solvent non-miscible with said light alcohol and in which said functionalised fatty acid ester is not soluble in order to obtain a mixture of esters and glycerol; b) and at least one step of selectively extracting hydroxylated fatty acid esters by feeding into the reactor said extraction solvent in a backflush direction relative to the light alcohol in order to obtain an alcohol phase enriched with fatty acid esters, a glycerol phase and a cake. The invention can be used for obtaining a fraction having a high concentration of hydroxylated or epoxydised functionalised fatty acid esters, and a solvent phase containing the other non-functionalised fatty acid esters directly from the seeds of oleaginous plants.

16 Claims, 3 Drawing Sheets (56) References Cited

FOREIGN PATENT DOCUMENTS

| | | |
|---|---|---|
| GB | 797357 | 7/1958 |
| WO | WO 00/20540 | 4/2000 |

OTHER PUBLICATIONS

International Search Report for International Patent Application No. PCT/FR2010/050047, mailed Jun. 15, 2010.

* cited by examiner

METHOD FOR OBTAINING A FRACTION ENRICHED WITH FUNCTIONALIZED FATTY ACID ESTERS FROM SEEDS OF OLEAGINOUS PLANTS

CROSS-REFERENCE TO RELATED APPLICATIONS

This application is the U.S. National Phase of International Application No. PCT/FR2010/050047 filed on Jan. 13, 2010, which claims priority to French Application No. FR 0950330 filed Jan. 20, 2009.

FIELD OF THE INVENTION

The present invention relates to the oleochemistry field. More particularly, the invention relates to a method for the selective extraction of functionalized fatty acid esters from seeds of oleaginous plants.

BACKGROUND

Oleaginous plants contain many fatty acids, the most widespread of which are: palmitic acid, stearic acid, oleic acid, linoleic acid, linolenic acid, erucic acid, etc. Also among the fatty acids of oleaginous plants are fatty acids that are functionalized, in particular by means of one or more alcohol functions or of an epoxide function. The most widely known are the following fatty acids:
  ricinoleic acid (12-hydroxy-cis-9-octadecenoic acid), predominantly present in castor oil (between 85% and 90%) extracted from seeds of the castor oil plant (*Ricinus communis*); this hydroxy acid is also present at a content of approximately 18% in the oil extracted from *Jatropha gossypiifolia* seeds or in that from *Hevea brasiliensis;*
  lesquerolic acid (14-hydroxy-11-eicosanoic acid) extracted from seeds originating from species of the *Lesquerrella* genus, at a content of approximately 70% in the oil extracted from seeds originating from species of the *Lesquerrella* genus, in which there are also two other hydroxy acids: densipolic acid (12-hydroxy-9,15-octadecadienoic acid) and auricolic acid (14-hydroxy-11,17-eicosadienoic acid);
  beta-dimorphecolic acid (9-OH-18:2$\Delta^{10trans,12trans}$) present in the oil extracted from seeds of *Dimorphotheca pluvialis*, and its isomer coriolic acid (13-hydroxy-9,11-octadecadienoic acid) present at a content of approximately 70% in the oil extracted from seeds of *Coriaria myrtifolia;*
  kamlolenic acid (18-hydroxy-9,11,13-octadecatrienoic acid) present in the oil extracted from the seeds of the Kamala tree (*Mallotus phillipinensis*);
  coronaric acid (9,10-epoxy-cis-octadec-12-enoic acid) present in sunflower (*Chrysentemum*) oil, or at a content of approximately 91% in the seeds of *Bernardia pulchella;*
  vernolic acid (cis-12,13-epoxyoleic acid) present at a content ranging from 60% to 75% in the oil extracted from the seeds of *Euphorbia lagascae* or plants of the *Vernonia* genus, and also the hydrogenated homologs of these unsaturated fatty acids.

Oleaginous fatty acid esters are conventionally obtained by transesterification of the refined oil obtained from seeds by pressing, followed by extraction using an organic solvent such as hexane or acetone.

This set of processes is laborious, since it comprises many physicochemical transformation steps. Moreover, the resulting hydroxylated fatty acid esters have a high production cost.

Patent application EP 1 119 600 describes a method for producing fatty acid esters from oleaginous seeds, in an alcoholic medium optionally supplemented with another organic solvent, for example a ketone or an aliphatic hydrocarbon, in the presence of a basic catalyst. This method is advantageous since it makes it possible to reduce the fatty acid ester production costs, and has very good yields of these products.

However, this method has the following drawbacks i) and ii):

i) This technology is not simply transposable to the seeds of oleaginous plants, the extracted oils of which have contents of at least 10% in terms of functionalized fatty acids, in particular hydroxylated fatty acids, such as ricinoleic acid or lesquerolic acid. One of these plants is the castor oil plant. Castor oil comprises glycerol triricinoleate as the main component. Ricinoleic acid is a hydroxylated fatty acid. No other known natural oil contains such a high proportion of hydroxylated fatty acids. It is this characteristic glyceride composition which distinguishes castor oil from any other vegetable fats and oils and it is this which gives it its notable physical and chemical properties. Castor oil, which is a non-drying oil, thus has the highest viscosity number and density of all the natural oils. These properties are due in particular to the hydrogen bonds formed between the hydroxyl groups. Moreover, methanol is much more soluble in castor oil, but unfortunately so is glycerol. It is these properties which give castor oil a very particular behavior during chemical reactions and which mean that the known methods for transesterification of "ordinary" vegetable oils cannot quite simply be transposed to castor oil (N.B., the term "ordinary oil" is intended to mean nonfunctionalized oils extracted from oleaginous plants such as sunflower, rape, soya, peanut, olive tree, sesame, safflower, coconut or palm).

ii) In addition, this method does not make it possible to selectively extract the functionalized, in particular hydroxylated, fatty acid esters from the mixture of fatty acid esters obtained by means of the transesterification reaction. However, it is desirable to have a fraction enriched with hydroxylated fatty acid esters, containing, for example, methyl ricinoleate (or methyl 12-hydroxy-cis-9-octadecenoate), since such a fraction represents the starting point in the production of 11-aminoundecanoic acid, a constituent monomer of Rilsan® 11, which is a polyamide with exceptional physical properties, developed by the applicant. During the production of 11-aminoundecanoic acid, methyl ricinoleate is subjected to gas-phase thermal cracking. To this effect, it must contain a minimum amount of glycerides, i.e. of tri-, di- and monoglycerides, since these products are very difficult to vaporize, and often break down before vaporization, which results in a lowering of the selectivity of the cracking. Similarly, the methyl ricinoleate must contain a minimum amount of ricinoleic acid, which is itself also difficult to vaporize.

Document U.S. Pat. No. 7,112,229 describes a method for obtaining fatty acid esters for a biodiesel application. The method is carried out starting from oil-rich oleaginous plant seeds. This method comprises a prior step of processing the seeds, during which:
  the holes are removed from the seeds and the seeds are then cleaned using a vibrating sieve,
  the cleaned seeds are dried so as to reduce their moisture content to less than 0.5% by weight.

The dried seeds are introduced into a reactor with anhydrous alcohol; this heterogeneous mixture is converted into a homogeneous suspension by means of an agitator. It is only at this moment that a basic catalyst is introduced into the reactor. This reaction mixture is then heated for 30 to 90 minutes at a temperature of 30 to 78° C., resulting in transesterification of the triglycerides to give esters with a high conversion rate, of between 98% and 100%. The applicant has carried out tests according to the conditions given in the only example described in that document, but has not succeeded in obtaining the same results (see example 5 and appended FIGS. 2 and 3). It cannot therefore be considered that this technique is currently mastered by those skilled in the art.

A method for the selective extraction of esters of a hydroxylated acid is described in the publication by Tassignon P. et al., *Chem. Phys. Lipids* 71 (1994), 187-196. That document describes the obtaining of the methyl ester of dimorphecolic acid by transesterification of the crude oil extracted from *Dimorphotheca pluvialis* seeds in the presence of methanol and of a basic catalyst. The transesterification reaction is followed by an extraction step by means of aqueous methanol/hexane (1:1) or acetonitrile/hexane mixtures. The data given in table 1 show that the separation by means of aqueous methanol/hexane mixtures is better than that carried out by means of an acetonitrile/hexane mixture. This method remains very laborious, efficient separation requiring 4 funnels and 14 stages for separation of the two-phase mixtures. Furthermore, the liquid-liquid extractions described in paragraph 2.12 require the consumption of a large amount of solvents: 1970 ml of hexane and 3360 ml of methanol solution are required to treat 70.3 g of methyl ester and to recover 37.2 g of oil containing 95% of dimorphecolic acid methyl ester. Such amounts of solvent are not compatible with an industrial-scale application of the method for selective extraction described.

The present invention proposes to remedy these drawbacks by means of a method which makes it possible to selectively extract functionalized fatty acid esters. The term "functionalized fatty acid" is intended to mean, in the context of the invention, any fatty acid bearing in particular one or more alcohol functions or an epoxide function.

SUMMARY OF THE INVENTION

An object of the invention is therefore to make it possible to obtain a fraction enriched with functionalized, in particular hydroxylated, fatty acid esters, said fraction being suitable in particular for use as a starting material in the synthesis of intermediate chemical products, such as 11-aminoundecanoic acid.

Another object of the invention consists in obtaining these functionalized fatty acid esters directly from oleaginous seeds with high yields, so as to reduce the production cost thereof.

The present invention relates to a method for the selective extraction of functionalized fatty acid esters from seeds of oleaginous plants, comprising:

a) at least one step of extracting the fatty acid esters that consists in simultaneously feeding, into a reactor containing said seeds, a light anhydrous alcohol, a basic catalyst and an extraction solvent which is immiscible with said light alcohol and in which said functionalized fatty acid ester is not soluble, so as to obtain a mixture of esters and glycerol, and b) at least one step of selectively extracting the hydroxylated fatty acid esters by feeding said extraction solvent into the reactor in a countercurrent direction with respect to the light alcohol, so as to obtain an alcohol phase enriched with fatty acid esters, a glycerol phase and an oil cake.

This method makes it possible to obtain a fraction concentrated with respect to hydroxylated or epoxidized functionalized fatty acid esters, and a solvent phase containing the other nonfunctionalized fatty acid esters directly from the seeds of oleaginous plants. The functionalized fatty acid esters targeted in the context of the invention are esters in particular of plant origin, containing predominantly fatty acid triglycerides. The total content of functionalized fatty acids in the oil containing these esters should be at least 10% by weight.

Oleaginous plants are cultivated specifically for their oil-producing seeds or fruits rich in fats, from which oil for food, energy or industrial use is extracted. Protein-producing plants belong to the botanical group of legumes, the seeds of which are rich in proteins. Oleaginous/protein-producing plants are legumes, the seeds of which also contain oil.

In the context of the present invention, the term "seeds of oleaginous plants" is intended to mean in particular seeds of castor oil plants, alone or as a mixture with seeds originating from at least one other oleaginous, oleaginous/protein-producing or protein-producing plant, the seeds or the seed mixture producing an oil containing at least 10% by weight of ricinoleic acid. It would not be a departure from the context of the invention if the seeds used in the method according to the invention were to entirely or partly originate from genetically modified plants producing ricinoleic acid, alone or as a mixture with optionally genetically modified oleaginous plants.

Figure 1:
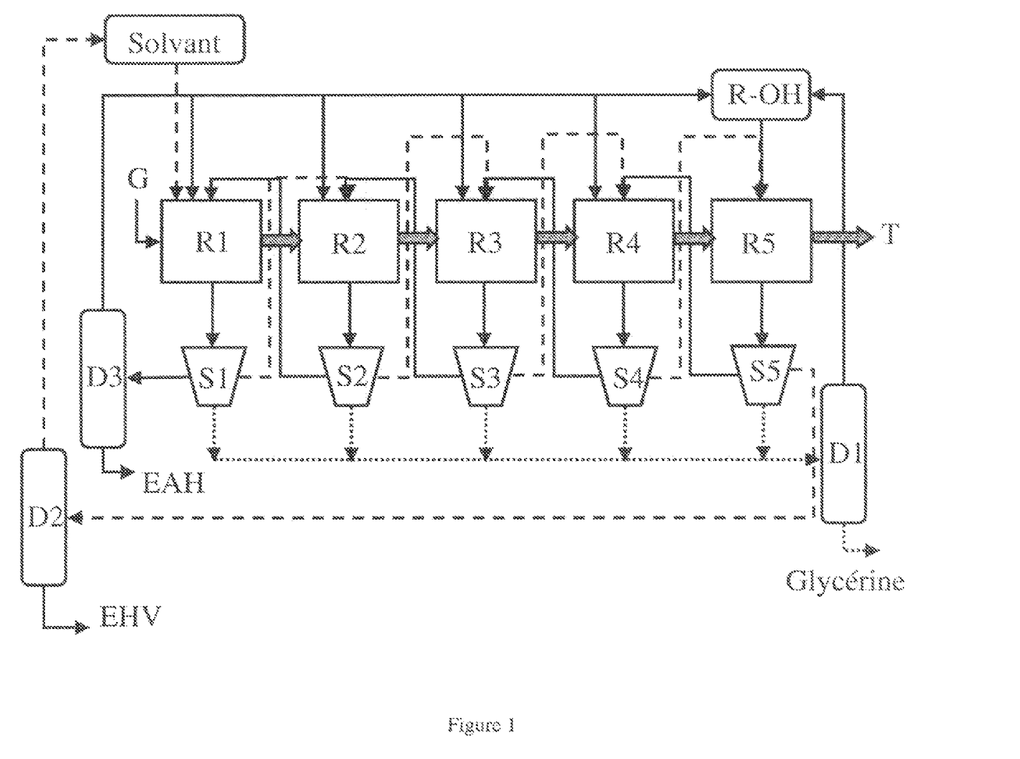
FIG. 1 is schematic of a method for the selective extraction of hydroxylated fatty acid esters wherein the method is carried out by means of five consecutive reactors and therefore comprises five extraction stages.

Other characteristics and advantages will emerge from the detailed description of the selective extraction method according to the invention which follows and the appended FIG. 1, representing schematically the method for the selective extraction of hydroxylated fatty acid esters according to the invention, in an embodiment variant comprising 5 reaction stages.

The object of the present invention is to provide a method which makes it possible to concentrate with respect to hydroxylated fatty acid ester a fraction resulting from the transesterification carried out directly on the seeds of oleaginous plants. When starting from castor oil plant seeds alone or as a mixture (as indicated above), the aim 1s to obtain a fraction enriched with ricinoleic acid ester.

DETAILED DESCRIPTION OF PREFERRED EMBODIMENTS

It has now been found that a hydroxylated or epoxidized functionalized fatty acid ester can be selectively extracted by means of a method using a reaction mixture comprising a light anhydrous alcohol, a basic catalyst and an extraction solvent which is immiscible with said light alcohol and in which said functionalized fatty acid ester is not soluble. Advantageously, said extraction solvent is fed in in a countercurrent direction with respect to the light alcohol, simultaneously causing a phenomenon of extraction of the nonfunctionalized esters in the solvent fraction (or phase), and therefore an enrichment with functionalized ester(s) in the alcohol fraction.

It is admittedly known practice to use solvents in order to facilitate the transesterification reaction, since, in the case of nonhydroxylated vegetable oils, methanol is not soluble in the oil, which greatly slows the transesterification reaction. The addition of a cosolvent will in this case promote homogenization of the reaction mixture, assisting the fatty acid esters in becoming more soluble in alcohol. However, in this case, glycerol is also not soluble in the methyl ester of the vegetable oil and therefore separates more spontaneously. The publication "The Biodiesel Handbook", ed. G. Knothe, J. Van Gerpen and J. Krahl, AOCS Press 2005, describes the addition of cosolvents, such as tetrahydrofuran (THF) or methyl tert-butyl ether (MTBE), in order to accelerate methanolysis of vegetable oils (chapter 4.1, page 6). However, the alcohol:oil molar ratios and also other parameters are affected by this addition of cosolvents.

The solvent is in this case chosen so as to be recovered and, consequently, has quite a low boiling point so that it can be distilled.

In the case of oils rich in functionalized acids, such as castor, lesquerella or dimorphotheca oil, methanol is soluble in the oil. The addition of an organic solvent (cosolvent) will in this case promote the obtaining of a heterogeneous medium, so as to prompt the nonfunctionalized fatty acid esters to pass into the nonalcoholic phase and the functionalized fatty acid esters to remain in the alcoholic phase.

The method according to the invention is therefore aimed at causing a phase separation in order to enrich the alcoholic phase with functionalized fatty acid ester and the solvent phase with nonfunctionalized fatty acid ester.

The method for the selective extraction of functionalized fatty acid ester(s) from seeds of oleaginous plants comprises:
a) at least one step of extracting the fatty acid esters that consists in simultaneously feeding, into a reactor containing said seeds, a light anhydrous alcohol, a basic catalyst and an extraction solvent which is immiscible with said light alcohol and in which said hydroxylated fatty acid ester is not soluble, so as to obtain a mixture of esters and glycerol, and
b) at least one step of selectively extracting the functionalized fatty acid ester(s) by feeding said extraction solvent into the reactor in a countercurrent direction with respect to the light alcohol, so as to obtain an alcohol phase enriched with functionalized fatty acid esters, a solvent phase containing the other nonfunctionalized fatty acid esters, a glycerol phase and an oil cake.

According to one embodiment, the oleaginous plants are castor oil plants and the hydroxylated fatty acid ester is the ester of ricinoleic acid.

It is desirable for the seeds used in the method according to the invention to have a degree of acidity of less than 2 mg KOH/g. This is because higher degrees of free fatty acids in the seed used as starting material result in the formation of soaps in a basic medium.

In one embodiment variant, the seeds undergo prior processing comprising a flattening step and, optionally, a step of drying the flattened seeds. This processing is carried out on whole seeds. It comprises a first operation in which the seeds are flattened, optionally followed by an operation in which the flattened seeds are dried.

The objective of the processing of the seed is to make the oil as accessible as possible to the alcohol, without, however, causing too much modification to its mechanical strength. This prevents the formation of a taste and of fines, respectively prejudicial to the implementation of a continuous process and to the final purification of the esters produced. Moreover, the processed seed should allow easy passage of the reaction fluid (alcohol/basic catalyst mixture) according to a simple percolation phenomenon.

According to one embodiment variant, the fresh seeds are flattened on a mechanical flattener with smooth or fluted rollers.

The seeds thus flattened can be dried, for example in a thermoregulated ventilated oven or in a continuous belt or rotary hot-air dryer. The drying time and the temperature are chosen so as to obtain a decrease in the moisture content of the seeds to values of less than or equal to 2% by weight. Preferably, the drying is carried out rapidly after flattening, in less than one hour, preferably after 5 to 10 minutes, at a temperature sufficient to reduce the moisture content of the seeds to 2% by weight or less.

The residual moisture of the seed is determined by thermogravimetric analysis. The seed is pre-ground, and then the ground material obtained is dried at 105° C. in a thermobalance until weight stabilization. The water content is expressed as percentage of the crude material.

According to another embodiment, the seeds are not dried after flattening. This is particularly suitable for extraction solvents having a high boiling point, such as kerdane, diesel oil or paraffin oil (see example 4.2). Surprisingly, it has been noted that, in the presence of these solvents, the water having remained in the seed does not constitute a nuisance for the transesterification reaction.

In one preferred embodiment variant, the seed processing step also comprises a seed preheating operation, carried out before the flattening operation. This preheating operation confers greater plasticity on the seed and therefore more efficient crushing during flattening (gain in terms of the contact surface, the alcohol percolation rate and therefore the extractive capacity of the alcohol). It is preferably carried out at a temperature of less than or equal to 100° C.

The processed or nonprocessed seeds are subjected, according to the method of the invention, to a first step of extracting the fatty acid esters, followed by a step of separating the hydroxylated fatty acid esters.

a) Step of Extraction and Transesterification (Reactive Grinding)

The seeds, optionally processed as described above, are brought into contact, in a reactor, with a light anhydrous alcohol, an alkaline catalyst and an extraction solvent, under temperature, stirring and time conditions sufficient to allow the extraction of the triglycerides from the seeds and the transesterification of said triglycerides, so as to obtain a mixture comprising fatty acid esters and glycerol, and an oily cake. Advantageously, firstly, the extraction solvent is immiscible with said light alcohol and, secondly, said hydroxylated fatty acid ester is insoluble or sparingly soluble in this solvent.

b) Step of Selective Extraction of the Hydroxylated Fatty Acid Ester

This step is carried out simultaneously with the preceding step, and consists in feeding said extraction solvent into the reactor in a countercurrent direction with respect to the light alcohol, so as to obtain an alcohol phase enriched with hydroxylated fatty acid esters, a solvent phase containing the other nonhydroxylated fatty acid esters, a glycerol phase and an oily cake. Various phases can optionally be washed, so as to achieve the desired technical characteristics.

The selective extraction method according to the invention comprises at least one step a) of extraction and transesterification and at least one step b) of selective extraction of the hydroxylated fatty acid ester(s). Preferably, these steps are repeated at least twice. According to one embodiment, the method comprises several consecutive reaction stages, with withdrawal of the alcohol (eliminated for example partially by evaporation), separation of the glycerin produced, reinjection of alcohol and continuation of the grinding.

In the embodiment illustrated in the appended FIG. 1, the extraction method is carried out by means of five consecutive reactors and therefore comprises five extraction stages.

The equipment represented in this figure comprise a series of five reactors mounted in cascade. The seeds (G) feed the reactor 1 (R1). Fresh solvent is fed into the same reactor, as is fresh alcohol and alcoholic solution originating from the next reaction stage. A solid fraction (partially extracted seeds, S1) and a liquid fraction are withdrawn from this first reaction stage. This liquid fraction is separated into three components: a glycerin-containing fraction, an alcoholic fraction, and a solvent-rich organic fraction. The solvent fraction is directed toward the next reactor. The alcoholic fraction is directed toward a unit for separation (D3), for example by distillation, so as to extract the hydroxylated fatty acid ester (HFAE) and the alcohol which is sent to storage and partly to each reaction stage.

Since the alcohol is consumed at each reaction stage, it is preferable to feed a part thereof at each stage in order to maintain sufficient ratios all along the reaction.

The separation of the various fractions can be carried out in various ways, including centrifugation, decanting and/or distillation. Optionally, the catalyst is neutralized before the step of separating the glycerin-containing phase from the alcoholic phase, and in this case, catalyst is reinjected in the next stage.

In the next reaction stage (R2), the partially converted seeds are brought into contact with the alcoholic fraction originating from the next stage (R3), the solvent fraction from the preceding stage (R1) and, optionally, fresh alcohol and also catalyst. As in the preceding stage, a separation (S2) is carried out on the liquid fraction leaving the reactor. The separation of the glycerin-containing fraction from the alcoholic fraction is optional, and does not need to be carried out at all the reaction stages.

In the final reaction stage (R5), the reactor is fed with fresh alcohol, and a wet oil cake (T) is withdrawn and is dried so as to recover the alcohol. The solvent fraction is isolated and directed to a unit for separation (D2), for example by distillation, so as to separate the solvent which is recycled and the vegetable oil ester (VOE).

The glycerin-containing fractions are collected, and distilled so as to recover the alcohol fraction which has dissolved therein.

A method of this type is carried out in a countercurrent direction with respect to alcohol and a cocurrent direction with respect to solvent, which makes it possible to isolate fractions, on the one hand, enriched with HFAE and, on the other hand, depleted.

In one variant of the method (not represented), the seeds are fed into the reactor 2, the reactor 1 then being used as a finisher in order to improve the separation in the solvent and alcoholic phases.

Preferably, the separation units D1, D2, D3 use heat-pump technologies, for example by mechanical vapor recompression or by means of an external heat pump.

The light alcohol used is a lower aliphatic alcohol, such as methanol, ethanol, isopropanol and n-propanol, and is preferably methanol.

The basic catalyst used in the method is chosen from the group: sodium hydroxide, alcoholic sodium hydroxide, solid sodium hydroxide, potassium hydroxide, alcoholic potassium hydroxide, solid potassium hydroxide, sodium or potassium methoxide, sodium or potassium ethoxide, sodium and potassium propoxide, and sodium and potassium isopropoxide.

As extraction solvents mention may be made of: hexane, heptane, benzene, bicyclohexyl, cyclohexane, decalin, decane, hexane (Texsolve C), kerosene, kerdane, diesel oil, paraffin oil, methylcyclohexane, Texsolve S or S-66, naphtha (Texsolve V), skellite, tetradecane, Texsolve (B, C, H, S, S-2, S-66, S-LO, V), supercritical $CO_2$, propane or butane which are pressurized, and natural solvents, such as terpenes (limonene, alpha- and beta-pinene, etc.). Preferably, the extraction solvent has a high boiling point, above 100° C., or better still above 200° C., for example between 200 and 350° C.

The ricinoleic acid ester thus obtained is intended in particular for preparing 11-aminoundecanoic acid, according to the following series of reactions:
 pyrolysis or cracking of the ricinoleic acid ester, in particular methyl ester, so as to obtain heptanal and methyl undecylenate;
 hydrolysis of the methyl undecylenate so as to obtain undecylenic acid;
 hydrobromination of the undecylenic acid so as to obtain 11-bromoundecanoic acid, and
 amination of the 11-bromoundecanoic acid so as to obtain 11-aminoundecanoic acid.

In one embodiment variant, the ricinoleic acid ester resulting from the method according to the invention can advantageously be directly used in the synthesis of 11-aminoundecanoic acid. When the ricinoleic acid ester is not sufficiently pure, an additional purification step may be necessary, before subjecting it to the pyrolysis reaction.

The resulting 11-aminoundecanoic acid is intended mainly for the synthesis by condensation of polyamide 11 or Rilsan® 11.

The nonfunctionalized acid esters obtained by means of the method according to the invention can be used as biofuel. In this case, it can be advantageous to directly use a hydrocarbon fraction, for example diesel oil or kerosene, as extraction solvent.

The selective extraction method according to the invention has many advantages. The method according to the invention makes it possible to simultaneously solve many problems associated with the transesterification of castor oil. This method advantageously makes it possible to go directly from the seed to the fatty acid esters, in particular ricinoleic acid esters, while avoiding the grinding, refining and purification steps and the production of by-products. The ricinoleic acid esters obtained by means of the method according to the invention are particularly suitable for the preparation of 11-aminoundecanoic acid, as mentioned above. Moreover, the method produces detoxified oil cakes, which can be handled risk-free by humans and can be used in animal field without the risk of poisoning the animals.

By virtue of the step of specific processing of the seeds, it is possible to increase the contact surface for better percolation of the alcohol-catalyst mixture and therefore better extraction of the lipids and subsequent conversion thereof to esters. No prior impregnation of the processed seeds is necessary. The ester fraction obtained from the mixture comprising fatty acid esters and glycerol is particularly suitable for producing 11-aminoundecanoic acid, a monomer used in the synthesis of polyamide 11.

The fact of starting from whole seeds makes it possible:
 firstly, to greatly limit the formation of fines, making the subsequent filtration steps easier and limiting the allergic and toxic risk since dry fines have a tendency to dissipate/disperse in the ambient air;

and, secondly, to maintain good mechanical strength of the bed of flattened seeds (that will form the oil cake), said property being very advantageous if it is desired to carry out the reaction in a continuous mode.

The invention and its advantages will be understood more clearly on reading the examples hereinafter, given purely by way of illustration.

EXAMPLE 1

Characterization of the Castor Seed

Three batches of castor seeds were evaluated in terms of their contents by weight of volatile matter and of fat, their degrees of acidity of the fat (expressed in mg KOH/g) and their ricin contents (expressed in mg ricin/kg seeds). The results obtained are given in table 1.

TABLE 1

| Characteristics | Method | Batch 1 | Batch 2 | Batch 3 |
|---|---|---|---|---|
| Volatile matter (%) | NF ISO 665 | 5.2 | 5.6 | 5.2 |
| Fat (% DM) | NF ISO 659 | 52.2 | 54.0 | 52.2 |
| Acidity of the fat, mg KOH/g | EN 14104 | 0.6 | 1.9 | 0.6 |

Example 2

Processing of the Castor Seed Flake

The castor seed derived from the castor husks—seed consisting of a fibrous shell containing a kernel itself covered with a thin skin (cuticle)—is flattened as it is (the whole seed) using a fluted-roller flattener, according to a double-flattening method described in table 2. This operation is carried out by passing through the flattener twice with a view to obtaining a castor seed petal. After flattening, the petal is dried in a ventilated oven under a stream of hot air at 100° C. for 16 hours with a view to achieving a residual moisture of less than 2%.

TABLE 2

| | 1st flattening | | 2nd flattening | |
|---|---|---|---|---|
| Equipment | Rotational speed (rpm) | Inter-roller space (mm) | Rotational speed (rpm) | Inter-roller space (mm) |
| Flattener with rollers Ø 240 mm, flute pitch 1 striation/cm | 430 | 0.1 | 430 | 0.1 |
| Average petal thickness (mm) | 0.4 to 0.6 mm | | 0.3 to 0.5 mm | |
| Length (mm) | 3 to 4 mm | | 2 to 3 mm | |

EXAMPLE 3

Reactive Grinding Test in the Presence of a Mixture of Oleaginous Seeds (According to Step a) of the Method According to the Invention)

A test was carried out using mixtures of castor (batch 1) and soya seeds. The batch of soyabeans was analyzed. The results obtained are given in table 3.

TABLE 3

| Characteristics | Method | Soyabean |
|---|---|---|
| Volatile matter, % | NF ISO 665 | 11.3 |
| Fat, % DM | NF ISO 659 | 20.6 |
| Acidity of the fat, mg KOH/G | EN 14104 | 1.6 |

These results show that the soya seed used is weakly acidic (acid number<2 mg/KOH/g) and in accordance with the literature in relation to its lipid content.

Reactive grinding tests were carried out on the isolated soyabean and the soyabean as a mixture with castor beans (table 4).

TABLE 4

| | test | | |
|---|---|---|---|
| Criterion | TEST 09-E14 | TEST 09-E19 | TEST 09-E21 |
| Weight of petals of castor seed of batch 1B, g | 0.0 | 175 | 35 |
| Weight of soyabean petals, g | 350 | 175 | 315 |
| Castor petal/soya petal weight ratio | 0/100 | 50/50 | 10/90 |
| Weight of methanol, g | 700 | 700 | 700 |
| Weight of sodium hydroxide used, g | 1.1 | 1.1 | 1.1 |
| Duration of reaction cycle (contact time), min | 30 | 30 | 30 |
| Reaction temperature (° C.) | 50 | 50 | 50 |
| Methanol/soya + castor petal weight ratio | 1.15 | 2 | 2 |
| % catalyst relative to soya + castor petals | 0.3 | 0.3 | 0.3 |
| Methyl ester yield, % | 39.2 | 52.3 | 74.0 |
| Fat in the reduced-fat oil cake, % methyl ester equivalents | 16.6 | 18.7 | 6.7 |
| Loss of esters (calculated value) **, % | 44.2 | 29 | 19.3 |
| Glycerin yield, % | 303 | 262 | 202 |

** loss of esters = [theoretical weight of esters] − [weight of esters produced] − [potential weight of esters in the reduced-fat oil cake]

These results presented show that:

the isolated soyabean, simply flattened according to a double-flattening process, produces a mediocre methyl ester yield (39.2%). The oil cake derived from this test is still rich in oil;

in the presence of castor seed petals (50/50 mixture), it is noted that the methyl ester yield (52.3%) corresponds approximately to the addition of the respective yields obtained in the presence of the isolated seeds (44% theoretical);

in the presence of the 10/90 castor-soya petal mixture, the methyl ester yield (74%) is slightly higher than that of the seeds taken separately (70% theoretical).

All these results show that it is technically possible to obtain a noticeable yield of esters starting from a mixture of castor/soya seed petals.

The esters obtained were analyzed and the results obtained are shown in table 5. The values between parentheses represent the theoretical percentage of fatty acids.

TABLE 5

| Criterion | TEST 09-E14 | TEST 09-E19 | TEST 09-E21 |
|---|---|---|---|
| Castor petal/soya petal weight ratio | 0.0 | 50/50 | 10/90 |
| Acid number (mg KOH/g) | <0.1 | 0.41 | 0.11 |
| MeCl6 content (%) | 10.22 | 2.20 (3.3) | 6.39 (7.8) |
| MeCl8:2 content (%) | 30.01 | 4.88 (6.6) | 34.64 (14.5) |
| MeCl8:1 content (%) | 47.11 | 14.11 (22.0) | 16.66 (53.8) |
| MeCl8:0 content (%) | 9.19 | 1.35 (1.7) | 2.57 (3.3) |
| Methyl ricinoleate content (%) | nd | 75.64 (66.3) | 38.88 (20.7) |
| Monoglyceride content (%) | 3.16 | 1.50 | 0.31 |
| Diglyceride content (%) | 0.21 | 0.11 | 0.10 |
| Triglyceride content (%) | nd | nd | nd |

All these results show that:
- from the qualitative point of view, the methyl ester of soya produced from the isolated bean petals is not very acidic (AN<0.1). On the other hand, it is rich in monoglycerides, which indicates that the transesterification reaction is not complete;
- in the presence of castor-soya petal mixtures, it is clearly apparent that the castor petal, the lipids of which are more soluble in methanol than those of soya, is more reactive in the co-grinding process than that of the isolated soya. Specifically, the methyl ricinoleate contents remain high since a notable enrichment with this ester compared with the theoretical concentrations is observed.

EXAMPLE 4

Reactive Grinding Tests in the Presence of a Cosolvent (Steps a) and b) of the Method According to the Invention)

EXAMPLE 4.1

Test in the Presence of Hexane and of Castor Seed Petals

A reactive grinding test was carried out in the presence of castor seed petals, methanol and hexane with a view to improving the ester yield (table 6):

TABLE 6

| Criterion | TEST 09-E06 | TEST 09-E07 |
|---|---|---|
| Weight of petals of castor seed of batch 2, g | 350 | 350 |
| Weight of methanol, g | 400 | 360 |
| Weight of hexane, g | — | 40 |
| Weight of sodium hydroxide used, g | 1.1 | 1.1 |
| Hexane/methanol weight ratio | 0.0 | 0.11 |
| Number of phases of the methanol-hexane mixture | 1 | 1 |
| (Methanol + hexane)/(soya + castor petals) weight ratio | 1.15 | 1.15 |
| Duration of reaction cycle (contact time), min | 30 | 30 |
| Reaction temperature (° C.) | 50 | 40 |

TABLE 6-continued

| Criterion | TEST 09-E06 | TEST 09-E07 |
|---|---|---|
| % catalyst relative to castor petals | 0.3 | 0.3 |
| Methyl ester yield, % | 79.3 | 84.3 |
| Fat in the reduced-fat oil cake, % methyl ester equivalents | 4.3 | 5.7 |
| Loss of esters (calculated value) **, % | 16.4 | 10 |
| Glycerin yield, % | 215 | 173 |

** loss of esters = [theoretical weight of esters] − [weight of esters produced] − [potential weight of esters in the reduced-fat oil cake]

These results show that, in the presence of hexane, the ester yield is greatly improved (79.3%→84.3%), even though the reaction temperature was reduced by 10° C. compared with the test in the absence of hexane. This result is partly related to a better depletion of the oil cake since fewer than 5 ester yield points are lost at this stage. The addition of hexane is also reflected by a positive impact on the yield of glycerin, which decreases, indicating that the latter is less loaded with fat and with vegetable fractions that are more soluble in methanol (phospholipids, carbohydrates, proteins). The addition of a cosolvent improves the ester yield.

The esters obtained were analyzed and the results obtained are shown in table 7.

TABLE 7

| Criterion | TEST 09-E06 | TEST 09-E07 |
|---|---|---|
| Hexane/methanol weight ratio | 0.0 | 10 |
| Acid number (mg KOH/g) | <0.01 | <0.01 |
| MeCl6 content (%) | 0.78 | 0.76 |
| MeCl8:2 content (%) | 2.51 | 2.49 |
| MeCl8:1 content (%) | 3.21 | 3.48 |
| MeCl8:0 content (%) | 0.93 | 0.98 |
| Methyl ricinoleate content (%) | 86.05 | 89.55 |
| Monoglyceride content (%) | 6.53 | 2.74 |
| Diglyceride content (%) | nd | nd |
| Triglyceride content (%) | nd | nd |

All these results show that, from the qualitative point of view, the methyl ricinoleate content is higher in the presence of hexane. The presence of hexane has a strong impact on the final monoglyceride content, which decreases in the presence of a hydrocarbon cosolvent. The final acidities of the esters are, on the other hand, relatively unaffected by the presence or the absence of hexane.

EXAMPLE 4.2

Test in the Presence of a Hydrocarbon Solvent Immiscible in Methanol

A test of reactive grinding of the castor seeds (batch 3) was carried out in the presence of a solvent that is insoluble with methanol, Kerdane® provided by the company Onyx, a hydrocarbon fuel fraction which is heavier than hexane. In the context of this test, the castor seeds were not dried after flattening. The objective of this test is to obtain, on the one hand, a fraction enriched with methyl ricinoleate and, on the other hand, a fraction enriched with nonhydroxylated methyl esters that can be used as they are as diesel fuel (biodiesel). It is therefore a question of carrying out, in a single step starting from castor seeds, 1) the preparation of an ester concentrated with respect to methyl ricinoleate, 2) a fuel fraction enriched with nonhydroxylated fatty esters that is close to an additized diesel, 3) glycerin and a defatted oil cake.

The reactive grinding step is carried out in the presence of a methanol-Kerdane®-sodium hydroxide mixture (1/1/0.003 weight ratio) and of castor seed petals not dried after flattening.

After recovery of the 1st miscella, the latter is decanted. The light phase rich in Kerdane® is separated from the methanolic heavy phase, and then mixed with 98% hydrated methanol, in a 1/1 weight ratio. This new two-phase mixture is sent over the castor seed petal bed so as to produce a second miscella. The latter is again decanted: the methanolic heavy phase is combined with the 1st methanolic phase.

The second light phase is again mixed with 98% methanol, still in a 1/1 weight ratio, and is in turn sent over the petal bed. The third miscella recovered is then decanted. The methanolic phase goes to the pool of heavy phases, whereas the Kerdane® phase is, as previously, again sent over the petal bed after having been mixed with 98% methanol (1/1 weight ratio).

The fourth miscella obtained is decanted and then stored, while the heavy phase goes to the pool of methanolic phases.

The petal bed is finally washed with hydrated methanol at 98% in a methanol/petal weight ratio of 1/1. All the methanolic miscellae go to the pool of the heavy phases, which pool will be treated so as to extract the purified esters therefrom.

The results obtained are presented in table 8.

This test confirms that the use of a methanol-immiscible hydrocarbon cosolvent makes it possible to extract the methyl esters with a high overall yield (81.1+16.6=97.7%). In particular, the methyl ricinoleate is extracted with a high yield (83.6%). It is noted that, in the presence of Kerdane, water is not a nuisance for the transesterification reaction.

Likewise, the use of a methanol-immiscible cosolvent makes it possible to extract with good selectivity the nonhydroxylated fatty esters, which are concentrated in the light phase. The low glycerin yield and also the low residual lipid content of the oil cake indicate an effective conversion of the fat into esters. Finally, the use of Kerdane® makes it possible to directly obtain an additized diesel fraction containing 10% of methyl esters.

TABLE 8

| Criterion | test TEST 09-E32 |
|---|---|
| Weight of nondried batch 3 castor seed petals, g (1) | 300 |
| Weight of methanol, g (1) | 300 |
| Weight of Kerdane ®, g (1) | 300 |
| Weight of sodium hydroxide used, g (1) | 0.9 |
| Kerdane ®/methanol weight ratio | 1.0 |
| Number of phases of the methanol-Kerdane ® mixture | 2 |
| (Methanol)/(castor petals) weight ratio | 1.0 |
| (Kerdane ®)/(castor petals) weight ratio | 1.0 |
| Duration of reaction cycle (contact time), min | 30 |
| Reaction temperature (° C.) | 50 |
| % catalyst relative to castor petals | 0.3 |
| Yield of esters in the heavy phase (methanolic phase), % | 81.1 |
| Methyl ricinoleate extraction yield (heavy phase), % | 83.6 |
| Yield of esters in the light phase (apart from Kerdane), % | 16.6 |
| % ester in Kerdane, % | 10.2 |

TABLE 8-continued

| Criterion | test TEST 09-E32 |
|---|---|
| Nonhydroxylated ester extraction yield (light phase), % | 78.0 |
| Fat in the reduced-fat oil cake, % methyl ester equivalents | 2.2 |
| Loss of esters (calculated value) **, % | 0.0 |
| Glycerin yield, % | 137 |

** loss of esters = [theoretical weight of esters] − [weight of esters produced] − [potential weight of esters in the reduced-fat oil cake]
(1) amount used in reactive grinding, i.e. during the first pass over the castor seed petal bed The esters obtained were analyzed and the results obtained are shown in table 9.

TABLE 9

| | test | |
|---|---|---|
| Criterion | Ester heavy phase (methanol) 09-E32 | Ester light phase (Kerdane ®) 09-E32 |
| Acid number (mg KOH/g) | 0.15 | NR |
| MeC16 content (%) | 0.63 | 5.29 |
| MeC18:2 content (%) | 2.35 | 20.9 |
| MeC18:1 content (%) | 2.35 | 17.1 |
| MeC18:0 content (%) | 0.84 | 8.69 |
| Methyl ricinoleate content (%) | 93.32 | 47.30 |
| Monoglyceride content (%) | 0.51 | 0.75 |
| Diglyceride content (%) | nd | nd |
| Triglyceride content (%) | nd | nd | nd—product not detected

All these results show that:
from the qualitative point of view, the esters derived from the methanolic heavy phase are enriched with methyl ricinoleate (93.3%), low in monoglycerides and very weakly acidic (AN=0.15 mg KOH/g), and, conversely, depleted with respect to nonhydroxylated esters;
the esters of the light phase are depleted with respect to ricinoleic acid and rich in nonhydroxylated fatty acids compared with the oil previously contained in the castor seed. Their residual monoglyceride content remains low;
the method can be easily improved by using less or no Kerdane during the steps of washing the petal bed, which will have the effect of limiting the methyl ricinoleate content in the light phase.

COMPARATIVE EXAMPLE 5

PETROBRAS Method for Obtaining Fatty Acid Esters According to U.S. Pat. No. 7,112,229

The characteristics of the reactants and of the seed used in the test are given in tables 10 and 11.

TABLE 10

| Reactants and castor seed | Supplier | Purity (%) |
|---|---|---|
| Anhydrous ethanol | CIRON | 99.9 |
| Sodium ethoxide | SIGMA ALDRICH | 96 |
| Castor seed | Arkema | — |

TABLE 11

| Characteristics | Method | Batch 3 |
|---|---|---|
| Volatile matter, % | NF ISO 665 | 5.2 |
| Fat, % DM | NF ISO 659 | 52.2 |
| Acidity of the fat, mg KOH/g | EN 14104 | 0.6 |

The test was reproduced as described in document U.S. Pat. No. 7,112,229. Sodium ethoxide at 96% was used as catalyst. Thus, since the ethoxide titer was not indicated, it was considered that the process scheme illustrated in FIG. 1 of that document expressed a value in ethoxide equivalent, i.e. 40 g. Likewise, the test was reproduced in the presence of a dried seed containing 0.5% moisture.

Figure 2:
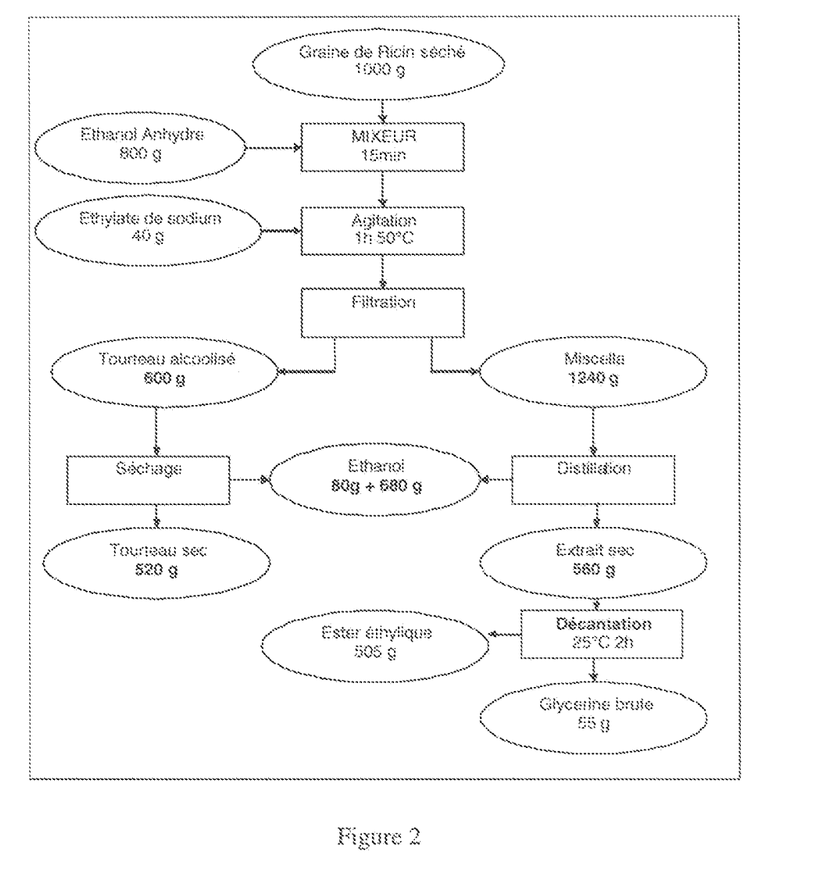
FIG. 2 is a schematic of the PETROBRAS method for obtaining fatty acid esters and lists the material balances obtained according to the Example in U.S. Pat. No. 7,112,229.
Figure 3:
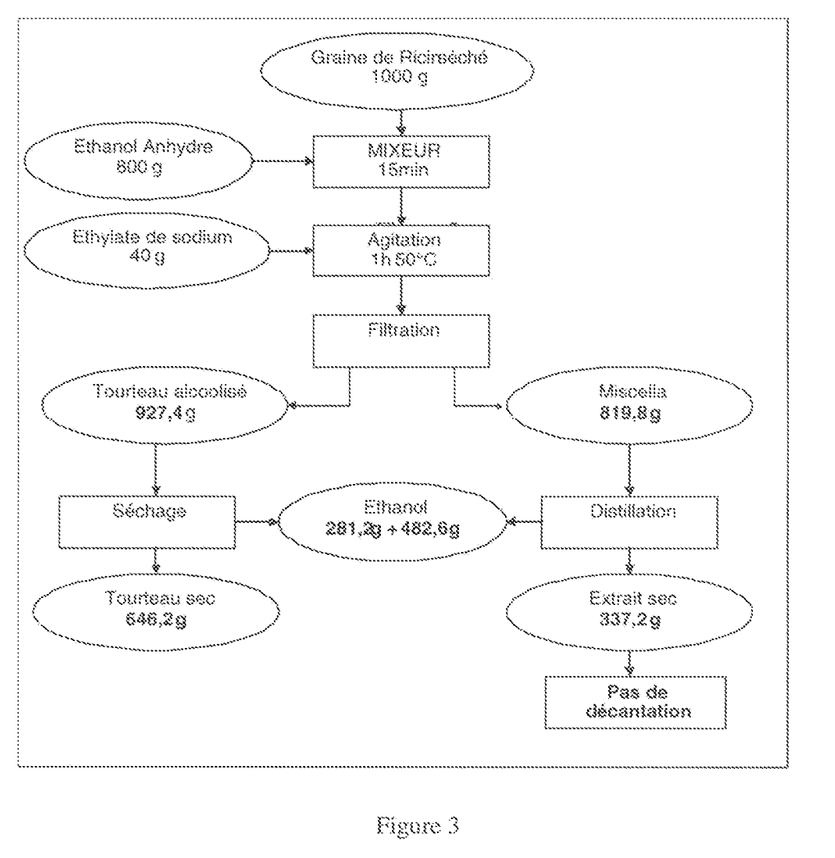
FIG. 3 is a schematic of the PETROBRAS method for obtaining fatty acid esters and lists the material balances obtained according to Comparative Example 5.

The appended FIGS. 2 and 3 and table 12 give the material balances obtained. FIG. 1 gives the balance according to document U.S. Pat. No. 7,112,229. FIG. 2 gives the balance according to comparative example 5.

FIGS. 2 and 3 and table 12 demonstrate a very large difference regarding the weights of products and coproducts circulating. By way of example: +250% of ethanol recovered in the oil cake, −100% of ethyl ester and of glycerin since neither of these 2 target products is recovered, −40% of dry extract in the miscella. The dry extract of the miscella is single-phase and syrupy (more viscous than an ethyl ester). No decanting of glycerin is obtained.

TABLE 12

| Yield | Example according to U.S. Pat. No. 7,112,229 | Comparative test | Difference between the 2 tests (%) |
|---|---|---|---|
| Dry oil cake, g | 520 | 646 | +24% |
| Ethanol recovered from the oil cake, g | 80 | 281 | +250% |
| Dry extract, g | 560 | 337 | −40% |
| Ethyl ester, g | 505 | 0.0 | −100% |
| Glycerin, g | 55 | 0.0 | −100% |

A more thorough analysis of the dry extract of the miscella was carried out by determining its ethyl ester content and glyeride content (by GC) and also the ash content (the level of ash makes it possible to quantify the amount of sodium present in the form of salts, of soaps and of unconsumed catalyst). We obtained the following results:

Ethyl esters: not detected
Triglycerides: 100%
Diglycerides: not detected
Monoglycerides: not detected
Ash: 0.4%.

The dry extract of the miscella consists, in terms of lipids, only of triglycerides not converted to esters. The ash content indicates that sodium is present in the miscella at a low content and not in the form of soaps as might have been assumed. The sodium must probably be trapped in the oil cake. Finally, the chromatographic analysis did not detect the presence of esters.

In conclusion, it therefore appears that the method described in document US 2005/0011112 does not produce any ricinoleic acid ethyl ester.

The invention claimed is:

1. A method for the selective extraction of functionalized fatty acid ester(s) from seeds of oleaginous plants comprising at least one extraction stage comprising:

(i) extracting fatty acid esters by simultaneously feeding into a reactor containing said seeds:
a light anhydrous alcohol
a basic catalyst, and
an extraction solvent,
wherein:
the extraction solvent is immiscible in the light alcohol, and
the functionalized fatty acid ester is not soluble in the extraction solvent, to yield a mixture of the fatty acid esters and glycerol; and (ii) selectively extracting the functionalized fatty acid esters by adding said extraction solvent into the reactor in a direction countercurrent to the light alcohol, to yield:
an alcohol phase enriched with the functionalized fatty acid ester(s),
a solvent phase comprising non-functionalized fatty acid esters,
a glycerol phase, and
an oil cake.

2. The method of claim 1, wherein the light alcohol comprises methanol.

3. The method of claim 1, wherein the basic catalyst comprises sodium hydroxide.

4. The method of claim 1, wherein the extraction solvent comprises hexane.

5. The method of claim 1, wherein the light alcohol comprises methanol, the basic catalyst comprises sodium hydroxide, and the extraction solvent comprises hexane.

6. The method of claim 1, comprising at least two extraction stages.

7. The method of claim 6, comprising five extraction stages.

8. The method of claim 1, further comprising a seed processing step comprising flattening and drying the seeds that is carried out prior to the extraction stage.

9. The method of claim 8, wherein the seed processing step further comprises preheating the seeds at a temperature of less than or equal to 100° C. before flattening the seeds.

10. The method of claim 8, wherein the seeds are dried less than one hour after flattening at a temperature sufficient to reduce the moisture content of the seeds by 2% by weight or less.

11. The method of claim 10, wherein the seeds are dried for a time ranging from 5 to 10 minutes after flattening.

12. The method of claim 1, wherein the functionalized fatty acid ester(s) comprise a hydroxylated fatty acid ester.

13. The method of claim 12, wherein the seeds comprise castor seeds, and the hydroxylated fatty acid ester comprises ricinoleic ester.

14. The method of claim 12, wherein the alcohol phase enriched with hydroxylated fatty acid esters is reacted in a succession of chemical reactions to yield 11-aminoundecanoic acid.

15. The method of claim 1, wherein the functionalized fatty acid ester comprises an epoxidized fatty acid ester.

16. The method of claim 1, wherein the extraction solvent comprises diesel oil, kerdane, or kerosene, and the alcohol phase is depleted of hydroxylated fatty acid and is used as a biodiesel.

* * * * *